United States Patent
Saito

(10) Patent No.: US 10,491,089 B2
(45) Date of Patent: Nov. 26, 2019

(54) COIL BLOCK MANUFACTURING METHOD

(71) Applicant: CASIO COMPUTER CO., LTD., Shibuya-ku, Tokyo (JP)

(72) Inventor: Yuta Saito, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 524 days.

(21) Appl. No.: 15/175,989

(22) Filed: Jun. 7, 2016

(65) Prior Publication Data

US 2017/0012512 A1    Jan. 12, 2017

(30) Foreign Application Priority Data

Jul. 10, 2015  (JP) .................. 2015-138828
Mar. 23, 2016  (JP) .................. 2016-058495

(51) Int. Cl.

| H02K 15/08 | (2006.01) |
|---|---|
| H01F 41/082 | (2016.01) |
| H02K 3/18 | (2006.01) |
| H02K 15/085 | (2006.01) |
| H01F 41/09 | (2016.01) |
| H01F 41/06 | (2016.01) |
| H01F 41/071 | (2016.01) |

(Continued)

(52) U.S. Cl.
CPC .............. *H02K 15/08* (2013.01); *H01F 41/06* (2013.01); *H01F 41/071* (2016.01); *H01F 41/082* (2016.01); *H01F 41/09* (2016.01); *H02K 3/18* (2013.01); *H02K 15/085* (2013.01); *H01F 41/10* (2013.01); *H02K 37/00* (2013.01); *H02K 37/16* (2013.01); *Y10T 29/49071* (2015.01)

(58) Field of Classification Search
CPC ........ H02K 15/08; H02K 15/085; H02K 3/18; H02K 37/00; H02K 37/16; H01F 41/06; H01F 41/071; H01F 41/082; H01F 41/09; H01F 41/10; Y10T 29/49071
See application file for complete search history.

(56) References Cited

U.S. PATENT DOCUMENTS 3,810,586 A * 5/1974 Tsukajaki ............... H02K 15/08
                                                    242/432.1
4,497,449 A * 2/1985 Lin .................... Y10T 29/49071
                                                    140/92.2

(Continued)

FOREIGN PATENT DOCUMENTS

| JP | 2003133155 A |   | 5/2003 |
| JP | 2013074119 A | * | 4/2013 |

OTHER PUBLICATIONS

Machine Language Translation (English) of Japanese Patent Publication, JP 2003-133155, Jan. 2019. (Year: 2019).*

*Primary Examiner* — A. Dexter Tugbang
(74) *Attorney, Agent, or Firm* — Holtz, Holtz & Volek PC

(57) ABSTRACT

A coil block manufacturing method of winding a wire around a coil core in which a core portion is provided between a first attachment portion and a second attachment portion, includes: a first step of fixing one end of the wire; a second step of, in a state of holding the first attachment portion of the coil core by a first chuck to expose the whole core portion, winding the wire around an end of the core portion; and a third step of, in a state of holding the second attachment portion of the coil core by a second chuck to expose the whole core portion, winding the wire around the whole core portion, to form a coil portion.

12 Claims, 15 Drawing Sheets

(51) Int. Cl.
*H02K 37/00* (2006.01)
*H01F 41/10* (2006.01)
*H02K 37/16* (2006.01)

(56) References Cited

U.S. PATENT DOCUMENTS

2002/0180572 A1* 12/2002 Kakehashi ............ H01F 41/082
 335/296
2007/0094863 A1* 5/2007 Ogawa .............. Y10T 29/49071
 29/605

* cited by examiner

COIL BLOCK MANUFACTURING METHOD

BACKGROUND OF THE INVENTION

1. Field of the Invention

The present invention relates to a method of manufacturing a coil block used in a motor such as a step motor, a coil block manufactured by the manufacturing method, and a motor including the coil block.

2. Description of the Related Art

As a coil manufacturing method of forming a coil portion by winding a wire such as an electric wire around a core shaft, for example, the following method is known as described in Japanese Patent Application Laid-Open No. 2003-133155. The method includes: a first step of cutting a wire to a predetermined length and bending both ends of the cut wire to form bends; and a second step of, using a wire chuck having a chuck body for locking the bends of the wire and a core shaft protruding from the apical surface of the chuck body, rotating the wire chuck to wind the wire on the outer periphery of the core shaft in the state in which the bends of the wire are locked by the chuck body.

In such a coil manufacturing method, a support surface for regulating the winding start part of the wire is formed at the apical portion of the chuck body of the wire chuck, so as to protrude in the axial direction of the core shaft in the form of a spiral sloping surface. Thus, with the coil manufacturing method, the wire chuck is rotated to wind the wire on the outer periphery of the core shaft one turn and, upon the next winding, the wire is wound while being displaced in the axial direction of the core shaft so as not to hamper the next winding.

In the case where such a coil manufacturing method is used in a method of manufacturing a coil block in a step motor, there is a gap between the wire at the start of the winding and the end surface of a board attachment portion.

SUMMARY OF THE INVENTION

The present invention provides a coil block manufacturing method that can enhance the performance of a coil portion by efficiently winding a wire around a core portion, a coil block manufactured by the manufacturing method, and a motor including the coil block.

One aspect of the present invention is a coil block manufacturing method of winding a wire around a coil core in which a core portion is provided between a first attachment portion and a second attachment portion, including: a first step of fixing one end of the wire; a second step of, in a state of holding the first attachment portion of the coil core by a first chuck to expose the whole core portion, rotating the first chuck to wind the wire around an end of the core portion on a first attachment portion side while keeping the wire in close contact with an end surface of the first attachment portion, the first attachment portion side being a side where the first attachment portion is located; and a third step of, in a state of holding the second attachment portion of the coil core by a second chuck to expose the whole core portion, rotating the second chuck to wind the wire around the whole core portion while keeping the wire in close contact with an end surface of the second attachment portion, to form a coil portion.

BRIEF DESCRIPTION OF THE SEVERAL VIEWS OF THE DRAWING

FIG. 2A is an enlarged plan view, FIG. 2B is an enlarged side view, and FIG. 2C is an enlarged sectional view in the direction of arrow A-A in FIG. 2A.

FIG. 3A is an enlarged plan view and FIG. 3B is an enlarged side view.

FIG. 4A is an enlarged plan view and FIG. 4B is an enlarged side view.

FIG. 5A is a view illustrating the state in which the wiring board is attached to the coil core in a first step, FIG. 5B is a view illustrating the state in which a board attachment portion of the coil core is held by a first chuck together with the wiring board in a second step, FIG. 5C is a view illustrating the state in which the first chuck is rotated to wind a wire substantially conically around the end of a core portion on the wiring board side in the second step, FIG. 5D is a view illustrating the state in which a stator attachment portion of the coil core is held by a second chuck in a third step, FIG. 5E is a view illustrating the state in which the second chuck is rotated to wind the wire around the whole core portion and thus form a coil portion in the third step, and FIG. 5F is a view illustrating the state in which the board attachment portion of the coil core is held by the first chuck together with the wiring board and the end of the wire is connected to a wiring pattern in a fourth step.

FIG. 6A is an enlarged plan view, FIG. 6B is an enlarged front view seen from the front (left), and FIG. 6C is an enlarged side view seen from the side.

FIG. 7A is an enlarged plan view, FIG. 7B is an enlarged front view in the direction of arrow B-B in FIG. 7A, and FIG. 7C is an enlarged side view seen from the side.

FIG. 8A is an enlarged plan view, FIG. 8B is an enlarged front view in the direction of arrow C-C in FIG. 8A, and FIG. 8C is an enlarged side view seen from the side.

FIG. 9A is an enlarged plan view, FIG. 9B is an enlarged front view in the direction of arrow D-D in FIG. 9A, and FIG. 9C is an enlarged side view seen from the side.

FIG. 10A is an enlarged plan view, FIG. 10B is an enlarged front view in the direction of arrow E1-E1 in FIG. 10A, and FIG. 10C is an enlarged sectional view in the direction of arrow F1-F1 in FIG. 10A.

FIG. 11A is an enlarged plan view, FIG. 11B is an enlarged front view in the direction of arrow E2-E2 in FIG. 11A, and FIG. 11C is an enlarged sectional view in the direction of arrow F2-F2 in FIG. 11A.

FIG. 12A is an enlarged plan view, FIG. 12B is an enlarged front view in the direction of arrow G-G in FIG. 12A, and FIG. 12C is an enlarged side view seen from the side.

FIG. 13A is an enlarged plan view, FIG. 13B is an enlarged sectional view in the direction of arrow H-H in FIG. 13A, and FIG. 13C is an enlarged side view seen from the side.

FIG. 14A is an enlarged plan view, FIG. 14B is an enlarged sectional view in the direction of arrow J-J in FIG. 14A, and FIG. 14C is an enlarged side view seen from the side.

DETAILED DESCRIPTION OF THE INVENTION

The following describes an embodiment in which the present invention is applied to a step motor of a wristwatch, with reference to FIGS. 1 to 14.

Figure 1:
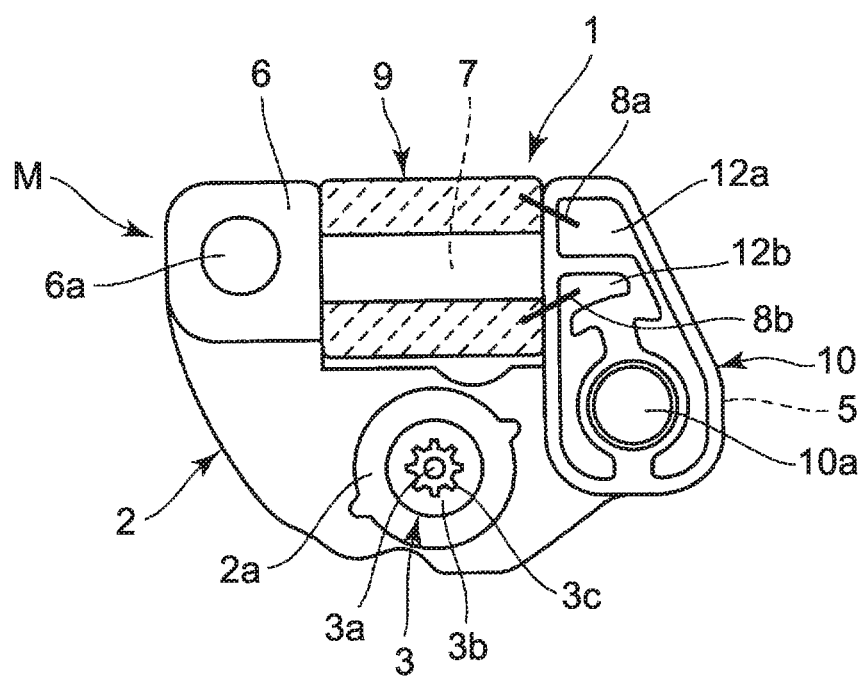
FIG. 1 is an enlarged plan view illustrating an embodiment in which the present invention is applied to a step motor of a wristwatch.

A step motor M includes: a coil block 1; a stator 2 attached to the coil block 1; and a rotor 3 placed in a rotor hole 2a of the stator 2 so as to be capable of step rotation, as illustrated in FIG. 1.

The coil block 1 includes a coil core 4, as illustrated in FIGS. 1 to 4B. The coil core 4 is composed of a metal plate containing a magnetic material, and includes: a board attachment portion 5 which is a first attachment portion; a stator attachment portion 6 which is a second attachment portion; and a core portion 7 between the board attachment portion 5 and the stator attachment portion 6, as illustrated in FIGS. 3A, 3B, 4A, and 4B. The core portion 7 is shaped like a band plate having a quadrilateral cross section. A wire 8 is wound on the outer periphery of the core portion 7, thus forming a coil portion 9.

The coil portion 9 is formed by winding the wire 8 around the core portion 7 with a thin insulation sheet (not illustrated), which is wound on the outer periphery of the core portion 7, in between, as illustrated in FIGS. 2A to 2C, 3A, and 3B. The coil portion 9 is provided on the core portion 7 in the state in which one end (the right end in FIG. 2A) of the coil portion 9 is in close contact with the end of the board attachment portion 5 without a gap with an insulation film (not illustrated) in between and the other end (the left end in FIG. 2A) of the coil portion 9 is in close contact with the end of the stator attachment portion 6 without a gap with an insulation film (not illustrated) in between.

Figure 2A:
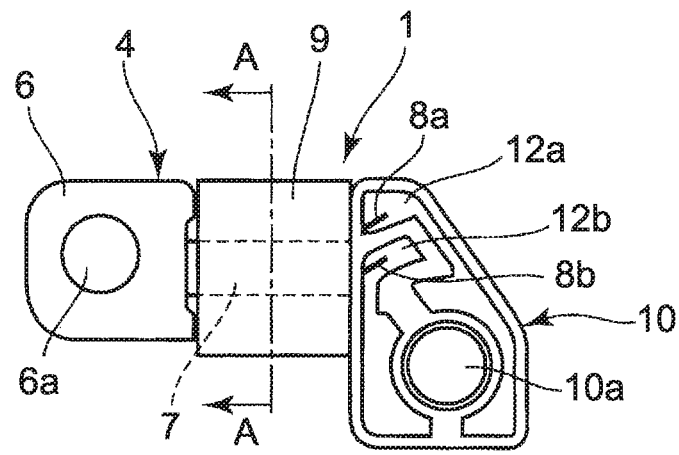
FIGS. 2A to 2C illustrate a coil block in the step motor illustrated in FIG. 1, where
Figure 2B:
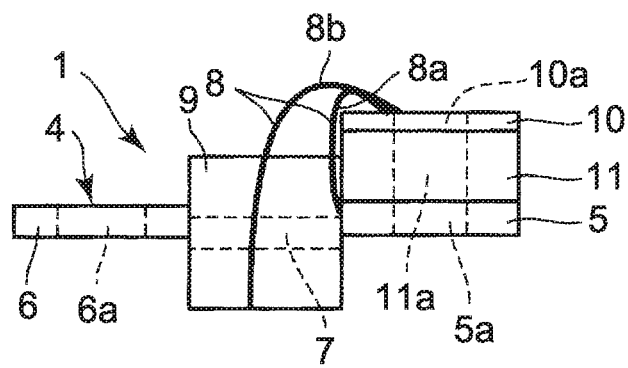
Figure 2C:
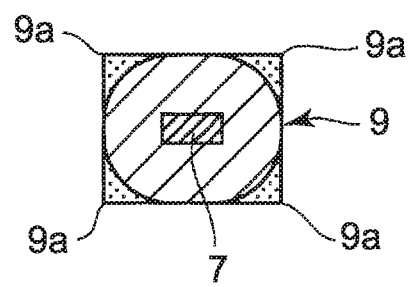

A fixing agent 9a is provided on the outer periphery of the coil portion 9, as illustrated in FIG. 2C. The fixing agent 9a is intended to prevent a winding collapse of the wire 8 of the coil portion 9, and applied to the outer peripheral surface of the coil portion 9 within the area defined by the tangents (four upper, lower, right, and left tangents illustrated in FIG. 2C) to the outer diameter of the coil portion 9. This minimizes the whole size of the coil portion 9, even when the fixing agent 9a is applied to its outer peripheral surface.

The board attachment portion 5 has a substantially triangular shape wider than the core portion 7, and has an attachment hole 5a on its base side (the lower side in FIG. 4A), as illustrated in FIGS. 2A to 4B. The wiring board 10 is attached to the upper surface of the board attachment portion 5 with a metal spacer member 11 in between. The wiring board 10 has the same shape as the board attachment portion 5, and has an attachment hole 10a on its base side (the lower side in FIG. 3A) coaxially with the attachment hole 5a of the board attachment portion 5.

A pair of wiring patterns 12a and 12b are formed on the upper surface of the wiring board 10, as illustrated in FIGS. 1 to 3B. Of the pair of wiring patterns 12a and 12b, one wiring pattern 12a is connected with one end 8a of the wire 8 of the coil portion 9, and the other wiring pattern 12b is connected with the other end 8b of the wire 8 of the coil portion 9. The coil portion 9 is supplied with current from a motor drive source (not illustrated) via the pair of wiring patterns 12a and 12b of the wiring board 10, to generate a magnetic field.

The spacer member 11 is thicker than the board attachment portion 5, and has the same shape as the board attachment portion 5 and the wiring board 10, as illustrated in FIGS. 2A to 2C, 3A, and 3B. The spacer member 11 has an attachment hole 11a on its base side coaxially with the attachment hole 5a of the board attachment portion 5 and the attachment hole 10a of the wiring board 10. The end of the spacer member 11 on the core portion 7 side is provided with the above-mentioned insulation film (not illustrated) to prevent conduction caused by damage contact of the wire 8.

The stator attachment portion 6 of the coil core 4 has a substantially quadrilateral shape wider than the core portion 7, as illustrated in FIGS. 2A to 4B. The stator attachment portion 6 has an attachment hole 6a in its center part. The end of the stator attachment portion 6 on the core portion 7 side is formed to be in close contact with the end of the coil portion 9 with the above-mentioned insulation film (not illustrated) in between to prevent conduction caused by damage contact of the wire 8.

The stator 2 is composed of a metal plate containing a magnetic material, like the coil core 4. The stator 2 is in parallel with the coil portion 9, with both ends being attached to the board attachment portion 5 and the stator attachment portion 6, as illustrated in FIG. 1. In other words, the stator 2 has one end (the right end in FIG. 1) attached to the board attachment portion 5, and the other end (the left end in FIG. 1) attached to the stator attachment portion 6. The stator 2 has the rotor hole 2a through its thickness, in an intermediate part.

The rotor 3 is rotatably placed in the rotor hole 2a of the stator 2, as illustrated in FIG. 1. The rotor 3 has a cylindrical magnet 3b on a rotor shaft 3a, and a pinion 3c on the rotor shaft 3a above the magnet 3b. The magnet 3b is rotatably placed in the rotor hole 2a of the stator 2.

In such a step motor M in FIG. 1, when the wire 8 of the coil portion 9 is supplied with current via the pair of wiring patterns 12a and 12b formed on the wiring board 10 of the coil block 1, the coil portion 9 generates an alternating magnetic field which is guided to the stator 2. The alternating magnetic field guided to the stator 2 causes the magnet 3b of the rotor 3 to intermittently rotate in the rotor hole 2a of the stator 2, thus realizing the step rotation of the rotor 3.

A method of manufacturing the coil block 1 of the step motor M is described below.

Figure 5A:
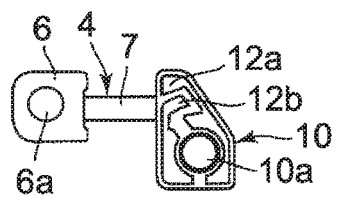
FIGS. 5A to 5F illustrate a method of manufacturing the coil block illustrated in FIGS. 2A to 2C, where
Figure 5B:
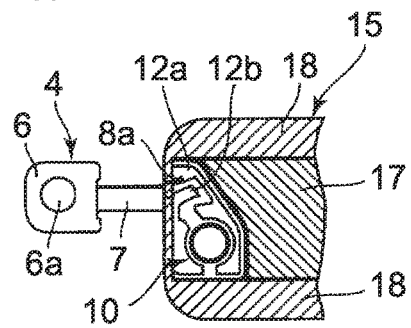
Figure 5C:
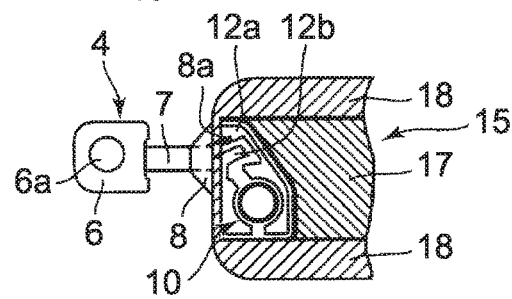

The method of manufacturing the coil block 1 includes: a first step of attaching the wiring board 10 to the board attachment portion 5 of the coil core 4 and connecting one end 8a of the wire 8 to one wiring pattern 12a of the wiring board 10; and a second step of holding the board attachment portion 5 of the coil core 4 by the first chuck 15 together with the wiring board 10 and rotating the first chuck 15 to wind the wire 8 around the end of the core portion 7 on the board attachment portion 5 side, as illustrated in FIGS. 5A to 5C.

Figure 5D:
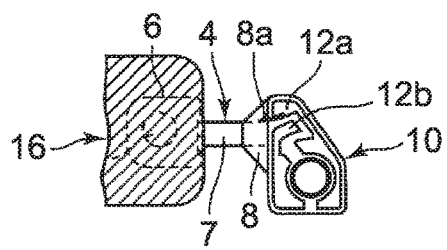
Figure 5E:
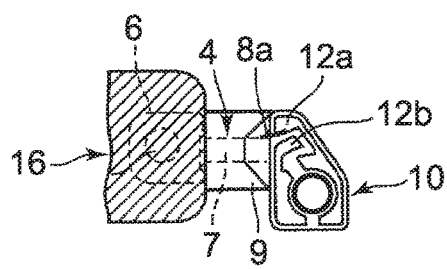
Figure 5F:
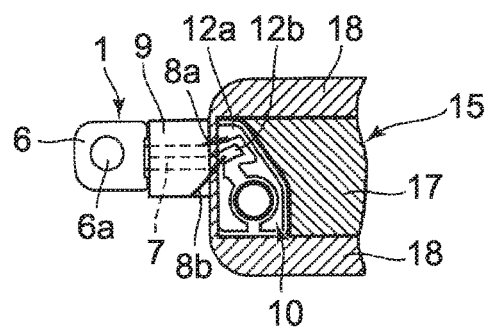
Figure 6A:
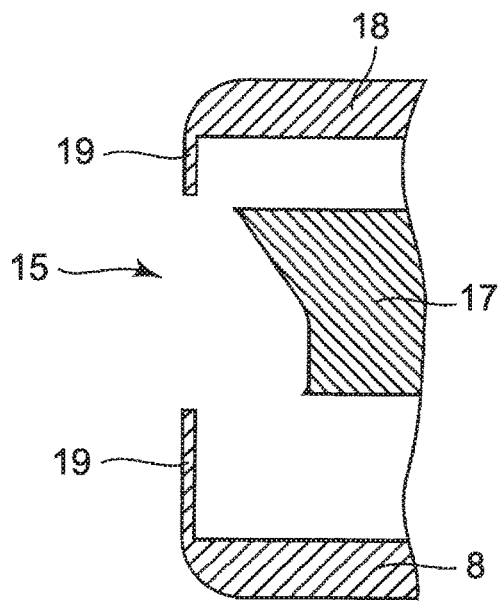
FIGS. 6A to 6C illustrate the first chuck illustrated in FIG. 5B, where
Figure 6B:
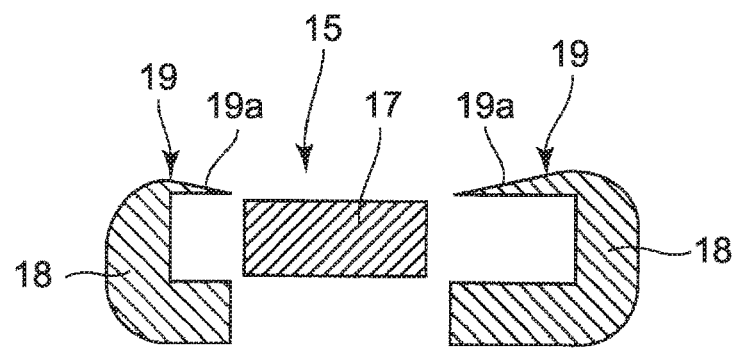
Figure 6C:
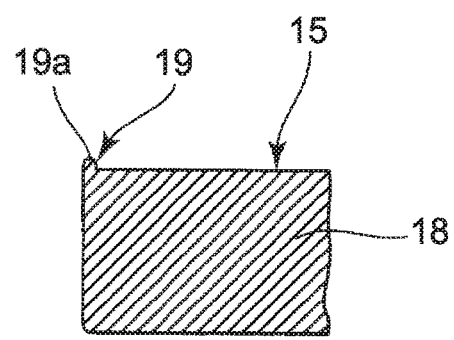
Figure 7A:
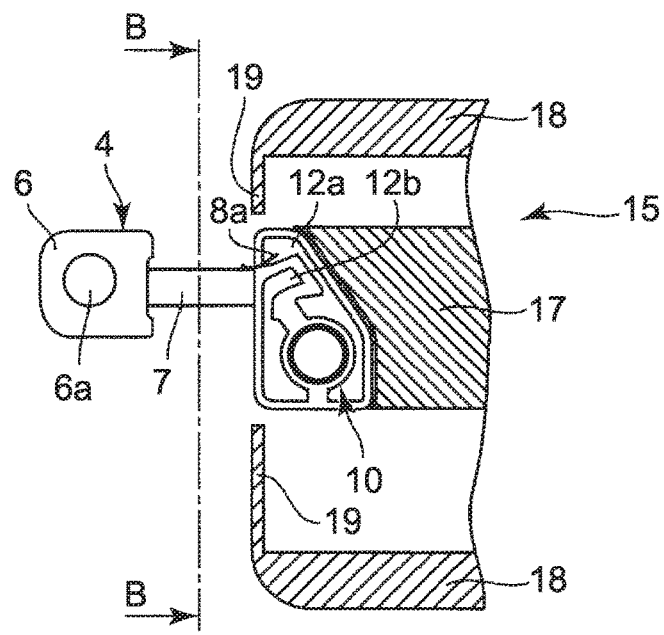
FIGS. 7A to 7C illustrate the state in which the board attachment portion of the coil core is held by the first chuck illustrated in FIGS. 6A to 6C, where
Figure 7B:
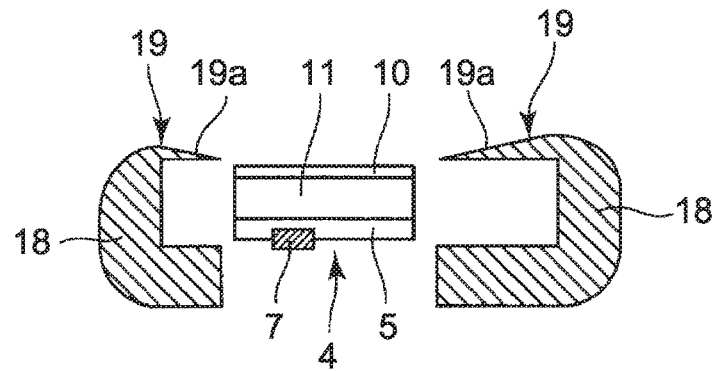
Figure 7C:
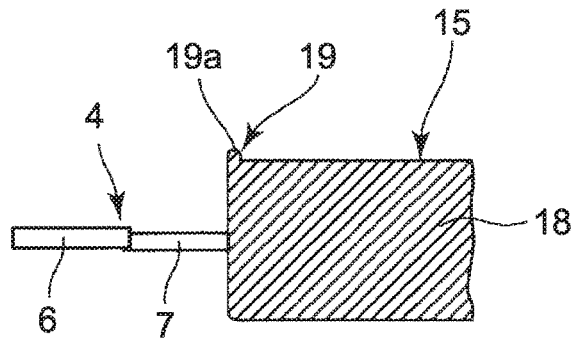

The method of manufacturing the coil block 1 also includes: a third step of holding the stator attachment portion 6 of the coil core 4 by the second chuck 16 and rotating the second chuck 16 to wind the wire 8 around the whole core portion 7 and thus form the coil portion 9; and a fourth step of connecting the other end 8b of the wire 8 to the other wiring pattern 12b of the wiring board 10 and applying the fixing agent 9a to the outer periphery of the coil portion 9, as illustrated in FIGS. 5D to 5F.

Figure 3A:
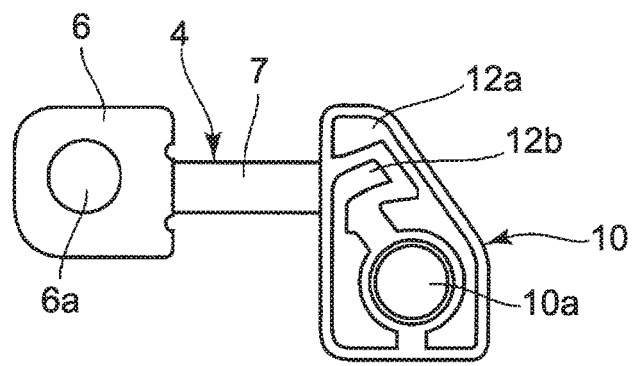
FIGS. 3A and 3B illustrate the state in which a wiring board is attached to a coil core of the coil block illustrated in FIG. 2, where
Figure 3B:
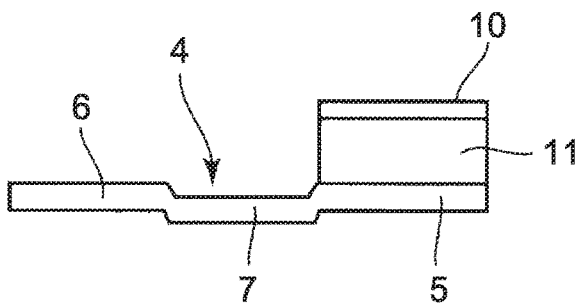
Figure 4A:
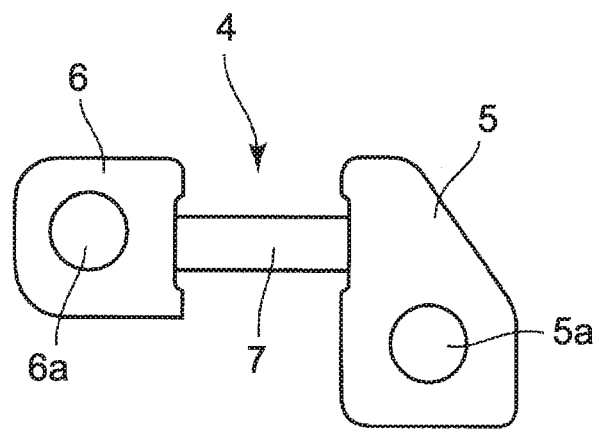
FIGS. 4A and 4B illustrate the coil core illustrated in FIGS. 3A and 3B, where
Figure 4B:
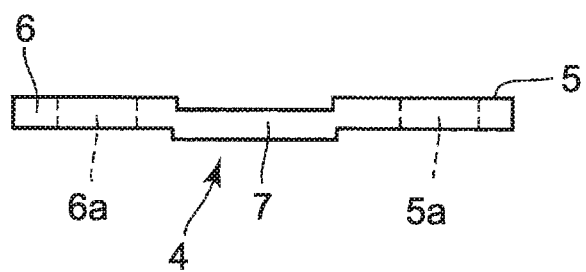

In the first step in the method of manufacturing the coil block 1, the wiring board 10 is attached to the board attachment portion 5 of the coil core 4 with the spacer member 11 in between, and the end 8a of the wire 8 is connected to the wiring pattern 12a of the pair of wiring patterns 12a and 12b formed on the wiring board 10 by thermocompression bonding, as illustrated in FIGS. 3A, 3B, and 5A.

When the spacer member 11 is overlaid on the board attachment portion 5 and the wiring board 10 is overlaid on the spacer member 11, all outer peripheral surfaces defining their outlines correspond to the same side surfaces because the board attachment portion 5, the spacer member 11, and the wiring board 10 have the same shape, as illustrated in FIGS. 3A and 3B.

Moreover, in the first step, an insulation sheet (not illustrated) for preventing conduction caused by damage contact of the wire 8 is wound on the outer periphery of the core portion 7. Here, an insulation film (not illustrated) for preventing conduction caused by damage contact of the wire 8 is provided on the respective end surfaces of the board attachment portion 5, spacer member 11, and wiring board 10, and the same insulation film (not illustrated) is also provided on the end surface of the stator attachment portion 6.

In the second step which follows, the whole core portion 7 is exposed when the board attachment portion 5 of the coil core 4 is held by the first chuck 15 together with the wiring board 10, as illustrated in FIGS. 5B and 8A to 8C. The first chuck 15 includes: a board positioning portion 17 for positioning the board attachment portion 5 of the coil core 4; and a pair of sandwiching claw portions 18 for sandwiching the board attachment portion 5 together with the wiring board 10 from both sides to cover the edge of the wiring board 10 in the state in which the end of the board attachment portion 5 on the core portion 7 side is open and exposed, the board attachment portion 5 being positioned by the board positioning portion 17, as illustrated in FIGS. 6A to 6C and 7A to 7C.

Thus, in the second step, when holding the board attachment portion 5 of the coil core 4 by the first chuck 15 together with the wiring board 10, the respective end surfaces of the board attachment portion 5, spacer member 11, and wiring board 10 on the core portion 7 side are exposed in the state of being substantially on the same plane as the respective end surfaces of the pair of sandwiching claw portions 18 of the first chuck 15 on the core portion 7 side, as illustrated in FIGS. 5B and 8A to 8C.

Figure 8A:
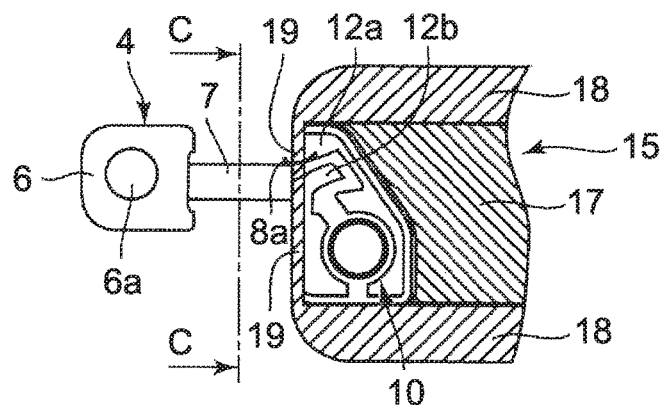
FIGS. 8A to 8C illustrate the state in which the board attachment portion of the coil core is held by the first chuck in the second step illustrated in FIG. 5B, where
Figure 8B:
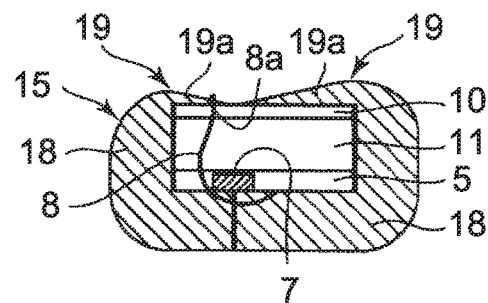
Figure 8C:
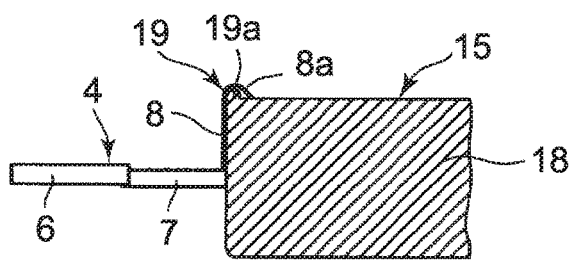
Figure 9A:
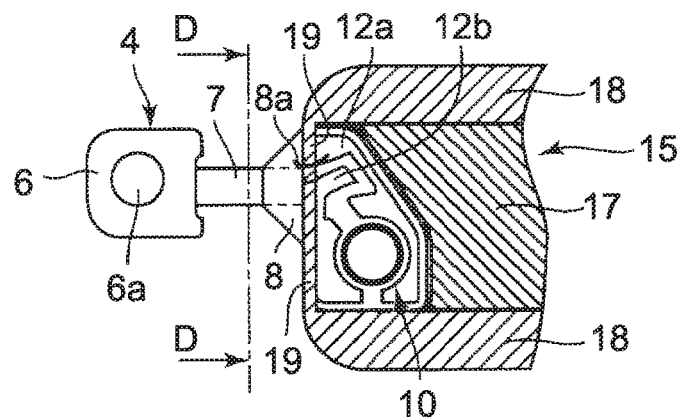
FIGS. 9A to 9C illustrate the state in which the first chuck is rotated to wind the wire around the core portion in the second step illustrated in FIG. 5C, where
Figure 9B:
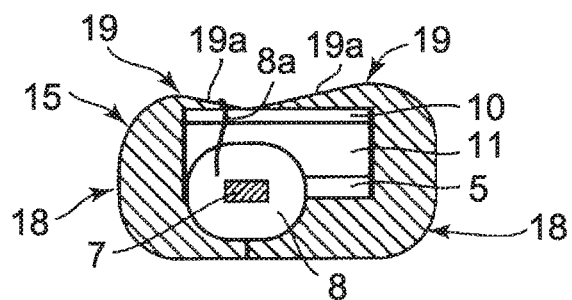
Figure 9C:
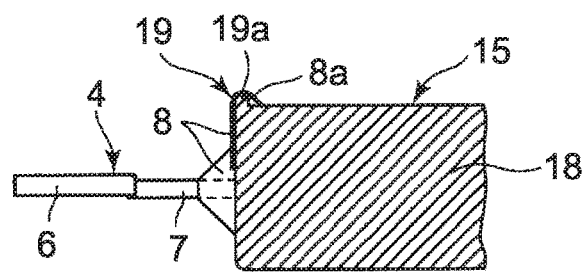
Figure 10A:
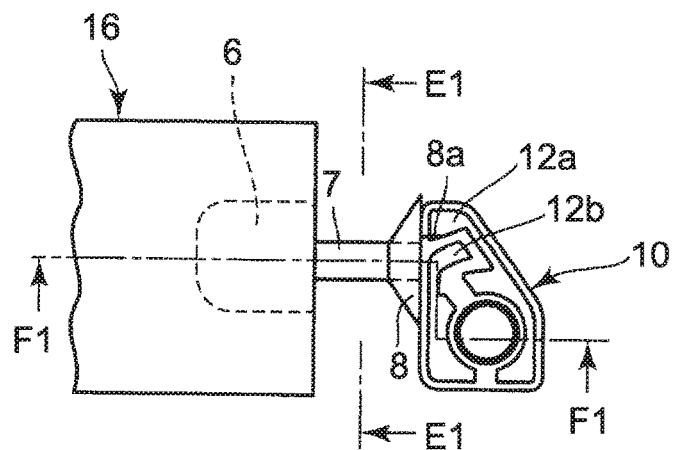
FIGS. 10A to 10C illustrate the state in which the stator attachment portion of the coil core is held by the second chuck in the third step illustrated in FIG. 5D, where
Figure 10B:
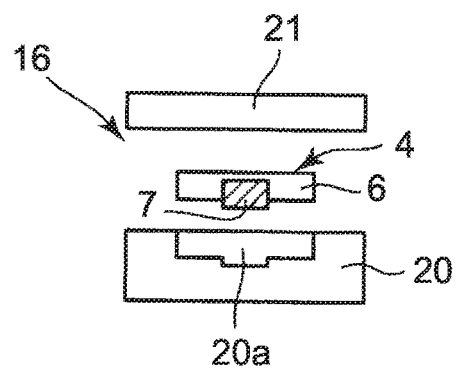
Figure 10C:
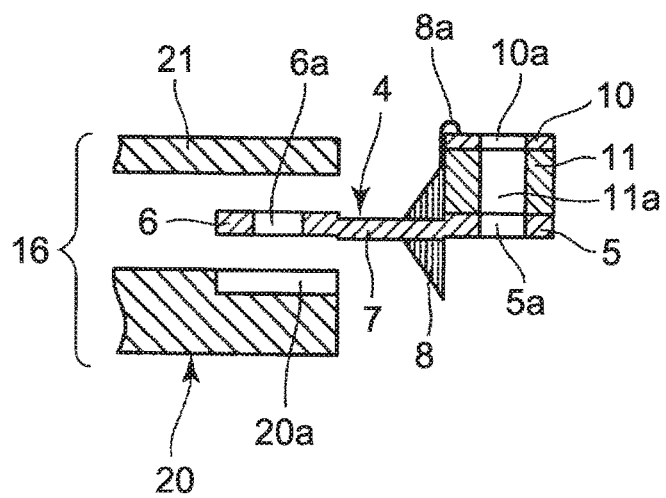
Figure 11A:
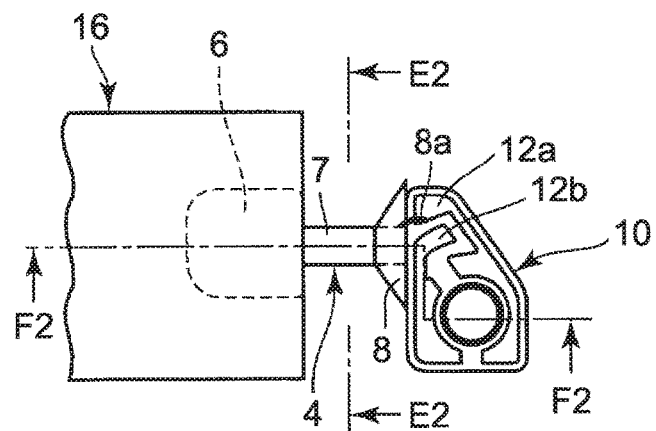
FIGS. 11A to 11C illustrate the state in which the stator attachment portion of the coil core is held by the second chuck illustrated in FIGS. 10A to 10C, where
Figure 11B:
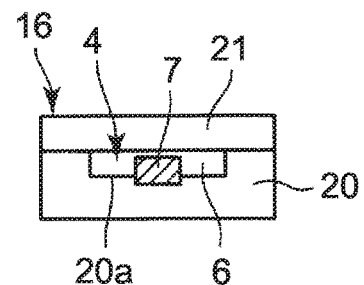
Figure 11C:
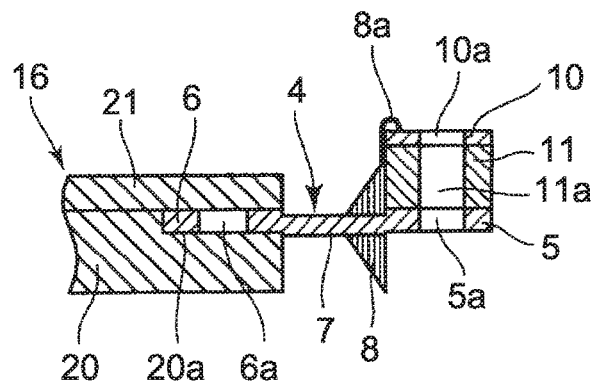
Figure 12A:
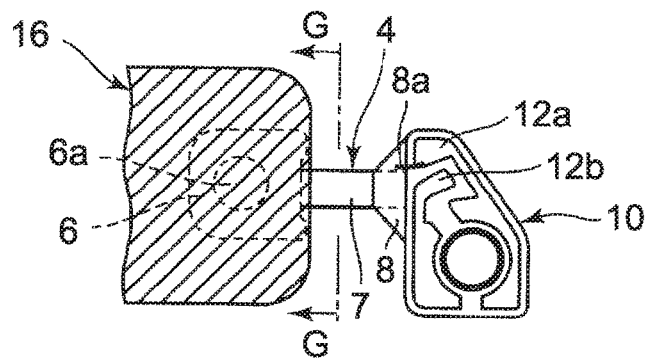
FIGS. 12A to 12C illustrate the state in which the stator attachment portion of the coil core is held by the second chuck in the third step illustrated in FIG. 5D, where
Figure 12B:
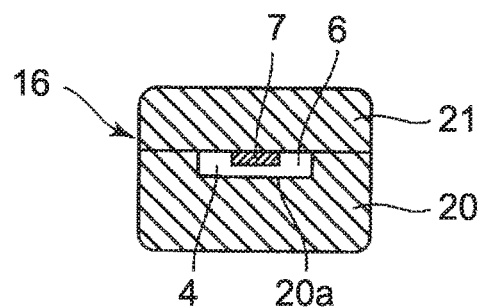
Figure 12C:
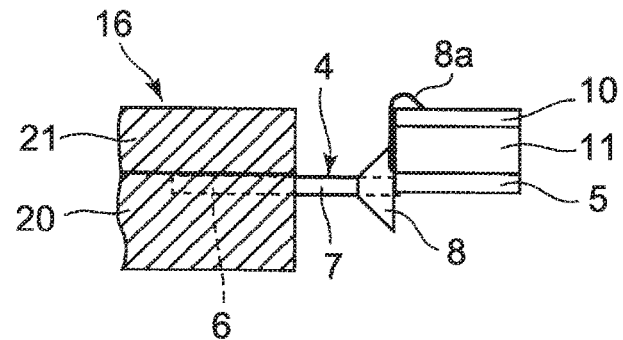
Figure 13A:
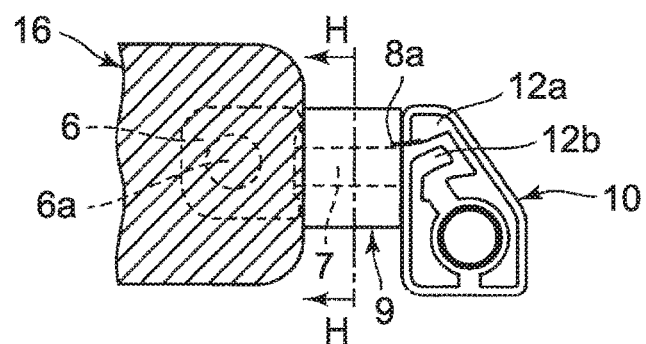
FIGS. 13A to 13C illustrate the state in which the second chuck is rotated to wind the wire around the whole core portion in the third step illustrated in FIG. 5E, where
Figure 13B:
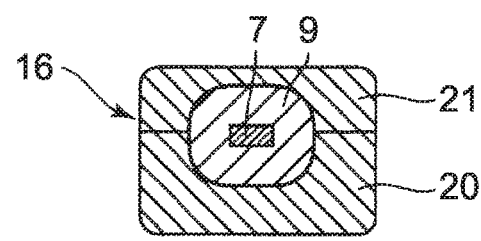
Figure 13C:
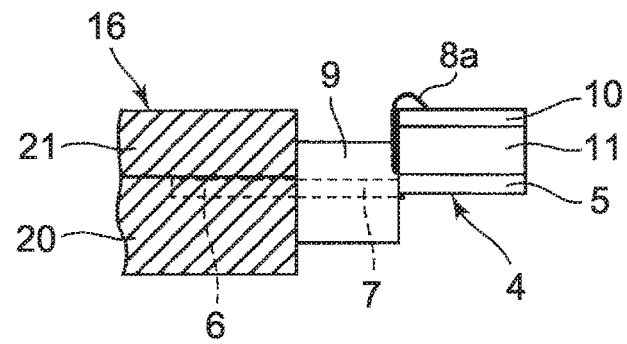
Figure 14A:
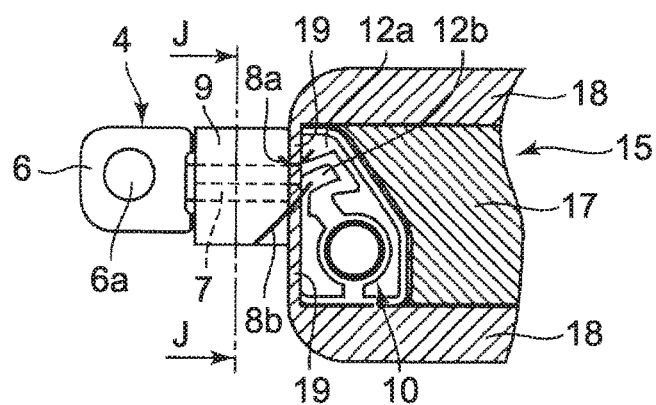
FIGS. 14A to 14C illustrate the state in which the board attachment portion of the coil core is held by the first chuck and the other end of the wire is connected to the other wiring pattern in the fourth step illustrated in FIG. 5F, where
Figure 14B:
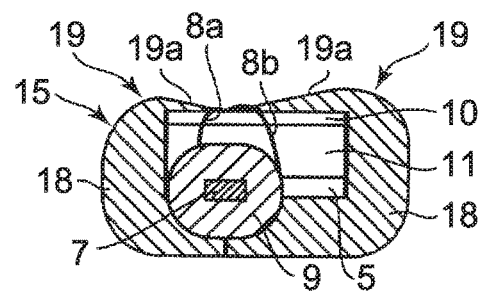
Figure 14C:
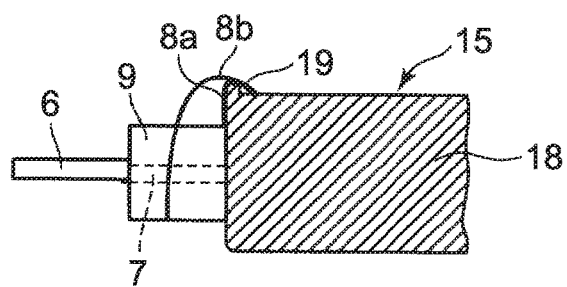

In detail, the respective end surfaces of the pair of sandwiching claw portions 18 of the first chuck 15 on the core portion 7 side slightly protrude, by a length much shorter than the diameter of the wire 8, toward the core portion 7 with respect to the respective end surfaces of the overlaid board attachment portion 5, spacer member 11, and wiring board 10 on the core portion 7 side, as illustrated in FIGS. 8A to 8C.

Hence, when winding the wire 8 around the core portion 7, the respective end surfaces of the pair of sandwiching claw portions 18 on the core portion 7 side guide the wire 8 so that the wire 8 is not caught on the respective end surfaces of the overlaid board attachment portion 5, spacer member 11, and wiring board 10, as illustrated in FIGS. 8A to 8C.

In the second step, when holding the board attachment portion 5 of the coil core 4 by the first chuck 15 together with the wiring board 10, the wire 8 having the end 8a connected to the wiring pattern 12a of the wiring board 10 is guided over the pair of sandwiching claw portions 18 of the first chuck 15 toward the core portion 7, as illustrated in FIGS. 8A to 8C.

The pair of sandwiching claw portions 18 are provided with a rounded semicircular wire guide protection portion 19 with a minimum height for preventing the wire 8 connected to the wiring pattern 12a of the wiring board 10 from coming into contact with the edge of the wiring board 10, as illustrated in FIGS. 6A to 8C. The wire guide protection portion 19 is inclined in the direction in which, when the pair of sandwiching claw portions 18 move away from each other along the wiring board 10 to release the board attachment portion 5 from the pair of sandwiching claw portions 18, a semicircular contact surface 19a in contact with the wire 8 gradually moves away from the wire 8.

Moreover, in the second step, when holding the board attachment portion 5 of the coil core 4 by the first chuck 15 together with the wiring board 10 and rotating the first chuck 15 to wind the wire 8 around the core portion 7 on the board attachment portion 5 side, the wire 8 is wound around the core portion 7 substantially conically where the number of turns of the wire 8 is large when the wire 8 is in contact with the end of the board attachment portion 5 and gradually decreases toward the stator attachment portion 6, as illustrated in FIGS. 5C and 9A to 9C.

In detail, when rotating the first chuck 15 to wind the wire 8 around the end of the core portion 7 on the board attachment portion 5 side, the first chuck 15 is reciprocated in the axial direction of the core portion 7 to wind the wire 8 around the core portion 7 while keeping the wire 8 in close contact with the respective end surfaces of the board attachment portion 5, spacer member 11, and wiring board 10. As a result, the wire 8 is wound around the core portion 7 substantially conically where the number of turns of the wire 8 is large when the wire 8 is in contact with the end of the board attachment portion 5 and gradually decreases toward the stator attachment portion 6, as illustrated in FIGS. 5C and 9A to 9C.

Thus, the wire 8 is wound so that the outer diameter of the part with a large number of turns of the wire 8 wound around the end of the core portion 7 on the board attachment portion 5 side is equal to the outer diameter of the below-mentioned coil portion 9, as illustrated in FIGS. 5C and 9A to 9C. In this state, there is no gap between the wire 8 and each of the respective end surfaces of the board attachment portion 5, spacer member 11, and wiring board 10.

In the third step which follows, the stator attachment portion 6 of the coil core 4 is held by the second chuck 16, as illustrated in FIGS. 5D and 12A to 12C. Although the board attachment portion 5 of the coil core 4 may be held by the first chuck 15 during this, it is desirable to release the board attachment portion 5 of the coil core 4 from the first chuck 15 and remove the first chuck 15.

The second chuck 16 includes: a stator positioning portion 20 having a positioning depression 20a for positioning the stator attachment portion 6 of the coil core 4 to expose the end of the stator attachment portion 6 on the core portion 7 side; and a stator press portion 21 for pressing the stator attachment portion 6 positioned by the stator positioning portion 20, against the stator positioning portion 20, as illustrated in FIGS. 10A to 10C and 11A to 11C.

When holding the stator attachment portion 6 of the coil core 4 by the second chuck 16, the end of the stator attachment portion 6 on the core portion 7 side is substantially on the same plane as the end surface of the second chuck 16 on the core portion 7 side and therefore the whole core portion 7 is exposed, as illustrated in FIGS. 5D and 12A to 12C.

In detail, the end surface of the second chuck 16 on the core portion 7 side slightly protrudes, by a length much shorter than the diameter of the wire 8, toward the core portion 7 with respect to the end of the stator attachment portion 6 on the core portion 7 side, as illustrated in FIGS. 5D and 12A to 12C. Hence, when winding the wire 8 around the core portion 7, the end surface of the second chuck 16 on the core portion 7 side guides the wire 8 so that the wire 8 is not caught on the end surface of the stator attachment portion 6.

In the third step, when holding the stator attachment portion 6 of the coil core 4 by the second chuck 16 and rotating the second chuck 16 to wind the wire 8 around the core portion 7, the second chuck 16 is reciprocated in the axial direction of the core portion 7 to wind the wire 8 around the whole core portion 7 while keeping the wire 8 in close contact with the end surface of the stator attachment portion 6 to thereby form the coil portion 9, as illustrated in FIGS. 5E and 13A to 13C.

Here, the wire 8 is wound around the whole core portion 7 while controlling the reciprocation of the coil core 4 in the axial direction of the core portion 7 by the second chuck 16, to make the outer diameter of the coil portion 9 uniform. The resulting coil portion 9 is substantially circular in cross section, and has a uniform outer diameter throughout the whole core portion 7. The coil portion 9 has its end in close contact with the end of the stator attachment portion 6 with the insulation film (not illustrated) in between so that there is no gap with the stator attachment portion 6, as illustrated in FIGS. 3A and 3B.

In the fourth step which follows, the board attachment portion 5 of the coil core 4 is held again by the first chuck 15 together with the wiring board 10, as illustrated in FIGS. 5F and 14A to 14C. Although the stator attachment portion 6 may be held by the second chuck 16 during this, it is desirable to release the stator attachment portion 6 from the second chuck 16 and remove the second chuck 16. In this state, the other end 8b of the wire 8 of the coil portion 9 is connected to the other wiring pattern 12b on the wiring board 10 by thermocompression bonding.

Moreover, in this state, the fixing agent 9a is applied to the outer periphery of the coil portion 9 to prevent a winding collapse of the wire 8 of the coil portion 9, as illustrated in FIG. 2C. Here, the fixing agent 9a is applied within the area defined by the tangents (four upper, lower, right, and left tangents illustrated in FIG. 2C) to the outer diameter of the coil portion 9. The resulting coil portion 9 has an overall shape which is substantially a quadrangular prism, and has a minimum size.

In this state, the pair of sandwiching claw portions 18 of the first chuck 15 are opened to remove the board attachment portion 5 of the coil core 4 from the first chuck 15. The coil block 1 is produced in this way. The fixing agent 9a may be applied only partially, as long as it is within the area defined by the tangents (four upper, lower, right, and left tangents illustrated in FIG. 2C) to the outer diameter of the coil portion 9. The fourth step may be omitted for a reduction in production cost, etc.

According to the method of manufacturing the coil block 1 in the step motor M described above, in the first step, the wiring board 10 is attached to the board attachment portion 5 of the coil core 4, and one end 8a of the wire 8 is connected to one wiring pattern 12a of the wiring board 10. In the second step, the board attachment portion 5 of the coil core 4 is held by the first chuck 15 together with the wiring board 10, and the first chuck 15 is rotated to wind the wire 8 around the end of the core portion 7 on the board attachment portion 5 side while keeping the wire 8 in close contact with the respective end surfaces of the board attachment portion 5 and wiring board 10. In the third step, the stator attachment portion 6 of the coil core 4 is held by the second chuck 16, and the second chuck 16 is rotated to wind the wire 8 around the whole core portion 7 while keeping the wire 8 in close contact with the end surface of the stator attachment portion 6, thus forming the coil portion 9. In the fourth step, the other end 8b of the wire 8 of the coil portion 9 is connected to the other wiring pattern 12b of the wiring board 10, and the fixing agent 9a is applied to the outer periphery of the coil portion 9. Hence, the performance of the coil portion 9 can be enhanced by efficiently winding the wire 8 around the core portion 7.

In the method of manufacturing the coil block 1, in the second step, the first chuck 15 holding the board attachment portion 5 of the coil core 4 together with the wiring board 10 is rotated to wind the wire 8 around the end of the core portion 7 on the board attachment portion 5 side while keeping the wire 8 in close contact with the respective end surfaces of the board attachment portion 5 and wiring board 10. Moreover, in the third step, the second chuck 16 holding the stator attachment portion 6 of the coil core 4 is rotated to wind the wire 8 around the whole core portion 7 while keeping the wire 8 in close contact with the end surface of the stator attachment portion 6. The coil portion 9 can be formed in this way.

With this method of manufacturing the coil block 1, the wire 8 is wound around the whole core portion 7, without any gap between the respective end surfaces of the board attachment portion 5 and wiring board 10 and the corresponding end of the coil portion 9 and between the stator attachment portion 6 and the corresponding end of the coil portion 9. The wire 8 can thus be efficiently wound around the core portion 7. This increases the magnetic flux generated by the coil portion 9, and so enhances the performance of the coil portion 9.

In the second step, when holding the board attachment portion 5 of the coil core 4 by the first chuck 15 together with the wiring board 10, the respective end surfaces of the board attachment portion 5 and wiring board 10 on the core portion 7 side are substantially on the same plane as the end surface of the first chuck 15 so as to be exposed. Accordingly, when rotating the first chuck 15 to wind the wire 8 around the core portion 7, the wire 8 can be brought into close contact with the respective end surfaces of the board attachment portion 5 and wiring board 10. As a result, the wire 8 can be efficiently wound around the core portion 7 without any gap between the respective end surfaces of the board attachment portion 5 and wiring board 10 and the end of the coil portion 9.

In detail, the end surface of the first chuck 15 on the core portion 7 side slightly protrudes, by a length much shorter than the diameter of the wire 8, toward the core portion 7 with respect to the respective end surfaces of the board attachment portion 5 and wiring board 10 on the core portion 7 side. Therefore, when winding the wire 8 around the core portion 7, the end surface of the first chuck 15 can guide the wire 8 so that the wire 8 is not caught on the respective end surfaces of the overlaid board attachment portion 5 and wiring board 10.

In addition, in the second step, when holding the board attachment portion 5 of the coil core 4 by the first chuck 15 together with the wiring board 10, the wire 8 connected to the wiring pattern 12a is guided over the first chuck 15 toward the core portion 7. Thus, when winding the wire 8 around the core portion 7, the first chuck 15 prevents the wire 8 connected to the wiring pattern 12a from coming into contact with the edge of the wiring board 10. A break of the wire 8 can be prevented in this way.

The first chuck 15 in the second step includes: the board positioning portion 17 for positioning the board attachment portion 5 of the coil core 4; and the pair of sandwiching claw portions 18 for sandwiching the board attachment portion 5 together with the wiring board 10 from both sides to cover the edge of the wiring board 10 in the state in which the end of the board attachment portion 5 on the core portion 7 side is open and exposed, the board attachment portion 5 being positioned by the board positioning portion 17. Accordingly, the whole core portion 7 of the coil core 4 can be exposed reliably and favorably when holding the board attachment portion 5 by the first chuck 15 together with the wiring board 10.

The pair of sandwiching claw portions 18 are provided with the semicircular wire guide protection portion 19 for preventing the wire 8 connected to one wiring pattern 12a of the pair of wiring patterns 12a and 12b of the wiring board 10 from coming into contact with the edge of the wiring board 10. When winding the wire 8 around the core portion 7 while pulling the wire 8, the wire 8 is pressed against the semicircular wire guide protection portion 19. This reliably prevents a break of the wire 8 caused when the wire 8 is pressed against a corner in the edge of the wiring board 10.

The wire guide protection portion 19 is inclined in the direction in which, when the pair of sandwiching claw portions 18 move away from each other along the wiring board 10 to release the board attachment portion 5 from the pair of sandwiching claw portions 18, the semicircular contact surface 19a in contact with the wire 8 gradually moves away from the wire 8. Accordingly, when the pair of sandwiching claw portions 18 move away from each other along the wiring board 10, the wire 8 is kept from being caught on the pair of sandwiching claw portions 18 and breaking. The board attachment portion 5 can therefore be released from the pair of sandwiching claw portions 18 smoothly and favorably.

Moreover, in the second step, when winding the wire 8 around the end of the core portion 7 on the board attachment portion 5 side, the wire 8 is wound substantially conically where the number of turns of the wire 8 is large when the wire 8 is in contact with the end of the board attachment portion 5 and gradually decreases toward the stator attachment portion 6. This allows the end surface with a large number of turns of the wire 8 to be in close contact with the respective end surfaces of the board attachment portion 5 and wiring board 10 reliably and favorably. Therefore, the wire 8 can be wound around the core portion 7 efficiently and reliably, with any gap between the respective end surfaces of the board attachment portion 5 and wiring board 10 and the end of the coil portion 9.

In the third step in the method of manufacturing the coil block 1, when holding the stator attachment portion 6 of the coil core 4 by the second chuck 16, the end of the stator attachment portion 6 on the core portion 7 side is substantially on the same plane as the end surface of the second chuck 16 so as to be exposed. This allows the wire 8 to be in close contact with the end surface of the stator attachment portion 6, when winding the wire 8 around the core portion 7 by rotating the second chuck 16. As a result, the wire 8 can be efficiently wound around the whole core portion 7 without any gap between the end surface of the stator attachment portion 6 and the end of the coil portion 9.

In detail, the end surface of the second chuck 16 on the core portion 7 side in the third step slightly protrudes, by a length much shorter than the diameter of the wire 8, toward the core portion 7 with respect to the end of the stator attachment portion 6 on the core portion 7 side. Therefore, when winding the wire 8 around the core portion 7, the end surface of the second chuck 16 can favorably guide the wire 8 so that the wire 8 is not caught on the end surface of the stator attachment portion 6.

The second chuck 16 in the third step includes: the stator positioning portion 20 having the positioning depression 20a for positioning the stator attachment portion 6 of the coil core 4 to expose the end of the stator attachment portion 6 on the core portion 7 side; and the stator press portion 21 for pressing the stator attachment portion 6 positioned by the stator positioning portion 20, against the stator positioning portion 20. Accordingly, the part corresponding to the whole core portion 7 of the coil core 4 can be exposed reliably and favorably when holding the stator attachment portion 6 by the second chuck 16.

In the third step, when winding the wire 8 around the core portion 7 to form the coil portion 9, the wire 8 is wound while controlling the reciprocation of the coil core 4 in the axial direction of the core portion 7 by the second chuck 16. Hence, even though the wire 8 is wound around the end of the core portion 7 on the board attachment portion 5 side substantially conically, the outer diameter of the coil portion 9 formed by the wire 8 wound around the whole core portion 7 can be made uniform.

In the fourth step in the method of manufacturing the coil block 1, when applying the fixing agent 9a to the outer periphery of the coil portion 9, the fixing agent 9a is applied within the area defined by the tangents to the outer diameter of the coil portion 9. This minimizes the usage of the fixing agent 9a, and prevents a winding collapse of the wire 8 reliably and favorably with the minimum usage of the fixing agent 9a. This also minimizes the overall outside shape of the coil portion 9, so that the whole coil portion 9 can be made compact.

In the coil block 1 manufactured in this way, the wire 8 is in close contact with the respective end surfaces of the board attachment portion 5 and wiring board 10 and also the wire 8 is in close contact with the end surface of the stator attachment portion 6, so that the wire 8 can be wound around the whole core portion 7. Since the wire 8 is efficiently wound around the core portion 7 without any gap between the respective end surfaces of the board attachment portion 5 and wiring board 10 and the corresponding end of the coil portion 9 and between the stator attachment portion 6 and the corresponding end of the coil portion 9, the magnetic flux generated by the coil portion 9 can be increased to enhance the performance of the coil portion 9.

The coil block 1 has the spacer member 11 between the board attachment portion 5 of the coil core 4 and the wiring board 10. With this spacer member 11, the height of the wiring board 10 in the thickness direction with respect to the coil portion 9 can be increased to an optimal height. Even when the height of the wiring board 10 in the thickness direction with respect to the coil portion 9 is increased, the wire 8 can be efficiently wound around the core portion 7 without any gap between the respective end surfaces of the board attachment portion 5 and wiring board 10 and the corresponding end of the coil portion 9.

In the step motor M including such a coil block 1, the stator 2 having the rotor hole 2a is attached to the coil block 1, and the rotor 3 is placed in the rotor hole 2a of the stator 2 so as to be capable of step rotation. The coil portion 9 of the coil block 1 is supplied with current to generate an alternating magnetic field which is guided to the stator 2. The alternating magnetic field guided to the stator 2 causes the rotor 3 to intermittently rotate reliably and favorably.

In detail, in the step motor M, the stator 2 has one end attached to the stator attachment portion 6 of the coil block 1 and the other end attached to the board attachment portion 5 of the coil block 1, with the rotor hole 2a being in an intermediate part of the stator 2 between both ends. Accordingly, the alternating magnetic field generated by the coil portion 9 of the coil block 1 can be guided to the stator 2 reliably and favorably, so that the rotor 3 can be rotated reliably and favorably.

The rotor 3 in the step motor M has the cylindrical magnet 3b on the rotor shaft 3a, and the magnet 3b is rotatably placed in the rotor hole 2a of the stator 2. Hence, when the alternating magnetic field generated by the coil portion 9 of the coil block 1 is guided to the stator 2, the alternating magnetic field guided to the stator 2 causes the magnet 3b of the rotor 3 to intermittently rotate in the rotor hole 2a of the stator 2. This realizes smooth and favorable step rotation of the rotor 3.

Although the foregoing embodiment describes the step motor M in which the stator 2 is attached to one coil block 1 and the rotor 3 is placed in the rotor hole 2a of the stator 2, the present invention is not limited to such. For example, a first modification illustrated in FIG. 15 or a second modification illustrated in FIG. 16 is applicable.

Figure 15:
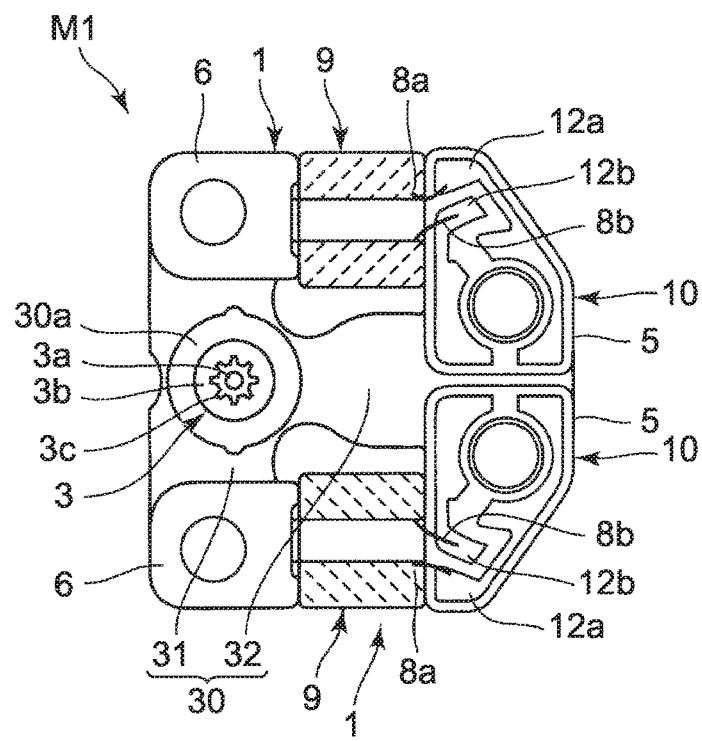
FIG. 15 is an enlarged plan view illustrating a first modification of the step motor using the coil block according to the present invention.
Figure 16:
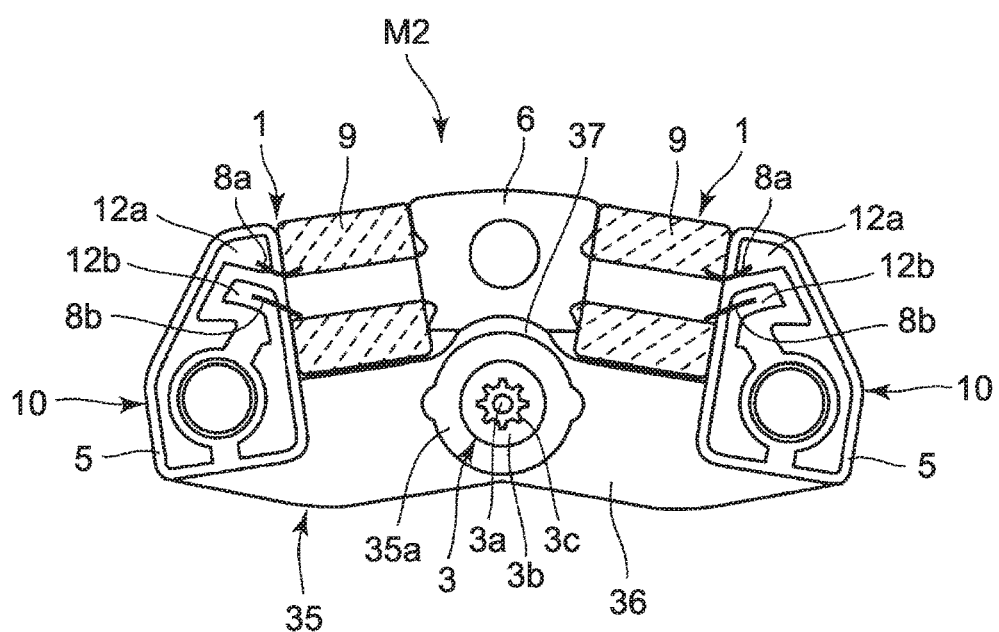
FIG. 16 is an enlarged plan view illustrating a second modification of the step motor using the coil block according to the present invention.

A step motor M1 according to the first modification illustrated in FIG. 15 includes: two coil blocks 1 arranged in parallel; one stator 30 attached to the two coil blocks 1; and the rotor 3 rotatably placed in a rotor hole 30a of the stator 30.

The stator 30 includes: a first connection portion 31 both ends of which are attached to the respective stator attachment portions 6 of the two coil blocks 1; and a second connection portion 32 provided in an intermediate part of the first connection portion 31 and attached to the respective board attachment portions 5 of the two coil blocks 1. The rotor hole 30a is located at the intersection of the first connection portion 31 and the second connection portion 32.

In such a step motor M1, when the respective coil portions 9 of the two coil blocks 1 are each supplied with current to generate an alternating magnetic field, the magnetic flux of the alternating magnetic fields generated by the respective coil portions 9 is greater than that in the foregoing embodiment. These alternating magnetic fields of the two coil portions 9 are guided to the first connection portion 31 and second connection portion 32 of the stator 30, and cause strong rotation of the rotor 3. The rotary power of the rotor 3 can thus be enhanced.

A step motor M2 according to the second modification illustrated in FIG. 16 includes: two coil blocks 1 arranged in series with the respective stator attachment portions 6 overlapping each other; one stator 35 attached to the two coil blocks 1; and the rotor 3 rotatably placed in a rotor hole 35a of the stator 35.

The stator 35 includes: a first connection portion 36 both ends of which are attached to the respective board attachment portions 5 of the two coil blocks 1; and a second connection portion 37 provided in an intermediate part of the first connection portion 36 and attached to one of the overlapping stator attachment portions 6 of the two coil blocks 1. The rotor hole 35a is located at the intersection of the first connection portion 36 and the second connection portion 37.

In such a step motor M2, when the respective coil portions 9 of the two coil blocks 1 are each supplied with current to generate an alternating magnetic field, the magnetic flux of the alternating magnetic fields generated by the respective coil portions 9 is greater than that in the foregoing embodiment, as in the first modification. These alternating magnetic fields of the two coil portions 9 are guided to the first connection portion 36 and second connection portion 37 of the stator 35, and cause strong rotation of the rotor 3. The rotary power of the rotor 3 can thus be enhanced.

Although the foregoing embodiment describes the method of manufacturing the coil block 1 in which the pair of sandwiching claw portions 18 in the first chuck 15 in the second step are each provided with the semicircular wire guide protection portion 19, the present invention is not limited to such. For example, only one of the pair of sandwiching claw portions 18 may be provided with the semicircular wire guide protection portion 19. Moreover, in the second step, a fixing agent may be applied to prevent a winding collapse of the wire after the wire 8 is wound around the core portion 7 conically.

Although the foregoing embodiment describes the case where the fixing agent 9a is applied to the outer periphery of the coil portion 9 to prevent a winding collapse of the wire 8 of the coil portion 9 in the fourth step, a fusible wire or the like may be used as the wire 8 so that the wire 8 is firmly fixed when heated to thereby prevent a winding collapse. In this case, the size of the coil portion can be minimized with no need for the fixing member.

Alternatively, after the wire 8 is wound around the whole core portion 7 to form the coil portion 9 in a slightly larger size in the third step, the fixing agent 9a may be applied to the outer periphery of the coil portion 9 to fix the outer periphery while compressing the coil portion 9 (for example, compressing to a designated dimension in the height direction and the width direction) in the fourth step. Since there is a gap between wires, the coil portion 9 is compressed while eliminating such a gap. The coil block manufactured in this way has a high wire density with a dense coil portion up to the designated dimension, and also the coil portion has a minimum size.

Although the foregoing embodiment describes the case where the present invention is applied to the step motor M, M1, or M2 of a wristwatch, the present invention is not limited to a wristwatch, and is applicable to any type of watch or clock such as a pocket watch, an alarm clock, a table clock, and a wall clock.

While an embodiment of the present invention has been described above, the present invention is not limited to such, but includes the scope of the invention set forth in the claims and its equivalent scope.

What is claimed is:

1. A coil block manufacturing method of winding a wire around a coil core in which a core portion is provided between a first attachment portion and a second attachment portion, the coil block manufacturing method comprising:
   a first step comprising attaching a wiring board on which a wiring pattern is formed to the first attachment portion, and connecting a first end of the wire to the wiring pattern of the wiring board;
   a second step comprising, in a state of holding the first attachment portion of the coil core together with the wiring board by a first chuck to expose all of the core portion, rotating the first chuck to wind the wire around an end of the core portion on a first attachment portion side while keeping the wire in close contact with an end surface of the first attachment portion, the first attachment portion side being a side where the first attachment portion is located; and
   a third step comprising, in a state of holding the second attachment portion of the coil core by a second chuck to expose all of the core portion, rotating the second chuck to wind the wire around all of the core portion while keeping the wire in close contact with an end surface of the second attachment portion, to form the coil portion,
   wherein in the second step, when holding the first attachment portion of the coil core together with the wiring board by the first chuck, respective end surfaces of the first attachment portion and the wiring board on a core portion side are substantially on a same plane as an end surface of the first chuck such that the respective end surfaces of the first attachment portion and the wiring board on the core portion side are exposed, the core portion side being a side where the core portion is located.

2. The coil block manufacturing method according to claim 1, wherein the end surface of the first chuck on the core portion side protrudes, by a length shorter than a diameter of the wire, toward the core portion with respect to the respective end surfaces of the first attachment portion and the wiring board on the core portion side.

3. The coil block manufacturing method according to claim 1, wherein in the second step, when holding the first attachment portion of the coil core together with the wiring board by the first chuck, the wire connected to the wiring pattern is guided over the first chuck toward the core portion.

4. The coil block manufacturing method according to claim 1, wherein the first chuck comprises:
   a board positioning portion for positioning which positions the first attachment portion of the coil core in the second step; and
   a pair of sandwiching claw portions which, in the second step, sandwich the first attachment portion from both sides to cover an edge of the wiring board in a state in which an end of the first attachment portion on the core portion side is open, the first attachment portion being positioned by the board positioning portion.

5. The coil block manufacturing method according to claim 4, wherein at least one of the pair of sandwiching claw portions is provided with a rounded wire guide protection portion which prevents the wire connected to the wiring pattern of the wiring board from coming into contact with the edge of the wiring board.

6. The coil block manufacturing method according to claim 5, wherein the rounded wire guide protection portion is inclined in a direction such that, when the pair of sandwiching claw portions move away from each other along the wiring board to release the first attachment portion from the pair of sandwiching claw portions, a semicircular contact surface in contact with the wire gradually moves away from the wire.

7. The coil block manufacturing method according to claim 1, wherein in the second step, when winding the wire around the end of the core portion on the first attachment portion side, the wire is wound substantially conically such that a number of turns of the wire gradually decreases from a position where the wire is in close contact with an end of the first attachment portion toward the second attachment portion.

8. The coil block manufacturing method according to claim 1, wherein in the third step, when holding the second attachment portion of the coil core by the second chuck, an end of the second attachment portion on a core portion side is substantially on a same plane as an end surface of the second chuck such that the end of the second attachment portion on the core portion side is exposed, the core portion side being a side where the core portion is located.

9. The coil block manufacturing method according to claim 8, wherein the end surface of the second chuck on the core portion side protrudes, by a length shorter than a diameter of the wire, toward the core portion with respect to the end of the second attachment portion on the core portion side.

10. The coil block manufacturing method according to claim 1, wherein the second chuck comprises:
    a stator positioning portion having a positioning depression which, in the third step, positions the second attachment portion of the coil core to expose an end of the second attachment portion on a core portion side, the core portion side being a side where the core portion is located; and
    a stator press portion which, in the third step, presses the second attachment portion, positioned by the stator positioning portion, against the stator positioning portion.

11. The coil block manufacturing method according to claim 1, wherein in the third step, when winding the wire around all of the core portion to form the coil portion, the wire is wound around all of the core portion while controlling reciprocation of the coil core in an axial direction of the core portion by the second chuck.

12. The coil block manufacturing method according to claim 1, further comprising:
    a fourth step comprising fixing an outer periphery of the coil portion,
    wherein in the fourth step, a second end of the wire is connected to the wiring pattern of the wiring board, and a fixing agent is applied to the outer periphery of the coil portion.

* * * * *

UNITED STATES PATENT AND TRADEMARK OFFICE
CERTIFICATE OF CORRECTION

PATENT NO. : 10,491,089 B2
APPLICATION NO. : 15/175989
DATED : November 26, 2019
INVENTOR(S) : Yuta Saito Page 1 of 1

It is certified that error appears in the above-identified patent and that said Letters Patent is hereby corrected as shown below:

In the Claims

Column 13, Line 53, after "portion" delete "for positioning".

Signed and Sealed this
Eighteenth Day of February, 2020

Andrei Iancu
*Director of the United States Patent and Trademark Office*